(12) United States Patent
Boggs et al.

(10) Patent No.: US 6,607,142 B1
(45) Date of Patent: Aug. 19, 2003

(54) ELECTRIC COOLANT PUMP CONTROL STRATEGY FOR HYBRID ELECTRIC VEHICLES

(75) Inventors: David Lee Boggs, Bloomfield Hills, MI (US); Mark William Peters, Wolverine Lake, MI (US); Stephen John Kotre, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/705,169

(22) Filed: Nov. 2, 2000

(51) Int. Cl.$^7$ ................................................ B60H 1/02
(52) U.S. Cl. ........................ 237/12.3 B; 180/65.1; 180/65.2
(58) Field of Search .................. 237/12.3 R, 12.3 B; 165/41, 42; 180/65.1, 65.2; 123/41.01, 41.02

(56) References Cited

U.S. PATENT DOCUMENTS

| | | | |
|---|---|---|---|
| 3,636,935 A | * 1/1972 | Martens | 123/122 AB |
| 4,434,749 A | * 3/1984 | Morita et al. | 123/41.02 |
| 4,508,264 A | * 4/1985 | Tekeda et al. | 237/12.3 B |
| 4,930,455 A | * 6/1990 | Creed et al. | 123/41.1 |
| 4,961,462 A | * 10/1990 | Iida et al. | 165/12 |
| 5,079,488 A | * 1/1992 | Harms et al. | 318/471 |
| 5,217,085 A | 6/1993 | Barrie et al. | |
| 5,237,975 A | 8/1993 | Betki et al. | |
| 5,251,588 A | * 10/1993 | Tsujii et al. | 123/142.5 R |
| 5,255,733 A | 10/1993 | King | |
| 5,291,960 A | 3/1994 | Brandenburg et al. | |
| 5,323,868 A | * 6/1994 | Kawashima | 180/65.4 |
| 5,529,114 A | * 6/1996 | Hall et al. | 165/41 |
| 5,531,285 A | * 7/1996 | Green | 180/65.2 |
| 5,537,956 A | * 7/1996 | Rennfeld et al. | 123/41.29 |
| 5,678,646 A | * 10/1997 | Fliege | 180/65.1 |
| 5,678,760 A | 10/1997 | Muso et al. | |
| 5,995,889 A | * 11/1999 | Eisenhour | 701/36 |
| 6,036,053 A | 3/2000 | Simmons et al. | |

FOREIGN PATENT DOCUMENTS

| | | |
|---|---|---|
| JP | 2000073763 A | 3/2000 |
| JP | 2001164704 A | 6/2001 |

* cited by examiner

Primary Examiner—Derek Boles
(74) Attorney, Agent, or Firm—Brooks & Kushman P.C.; Carlos L. Hanze

(57) ABSTRACT

This invention relates to a hybrid electric vehicle component coolant control system and method. The coolant system has an electric pump to move coolant through a closed system including engine and motor components. Such components to be cooled can include any electric motors, power electronics, engine, and transmission. The preferred embodiment controls coolant flow to the vehicle engine and motor in a single closed loop.

Vehicle components have temperature sensors that send temperature signals to an electric coolant pump duty cycle control strategy. The control strategy makes a determination of a duty cycle of the electric coolant pump as a function of the temperatures of vehicle components and orders the duty cycle of the electric pump.

In the preferred configuration, engine temperature sensors can acquire either engine coolant temperature or engine cylinder head temperature. The preferred configuration includes a heater core in the coolant flow path connected between vehicle components and the electric coolant pump return, whereby passenger heating requests are facilitated. Several coolant flow paths among the vehicle components are possible including a parallel and series configuration. The control system can also use a rolling average filter routine connected between the temperature sensor for the motor and the control strategy to determine the average temperature of the motor.

18 Claims, 4 Drawing Sheets

ELECTRIC COOLANT PUMP CONTROL STRATEGY FOR HYBRID ELECTRIC VEHICLES

BACKGROUND OF THE INVENTION

1. Field of Invention

The present invention relates generally to a hybrid electric vehicle (HEV), and specifically to an electric coolant pump control strategy for an HEV to maintain vehicle powertrain and accessory component temperatures within optimal operating temperatures.

2. Discussion of the Prior Art

The need to reduce fossil fuel consumption and emissions in automobiles and other vehicles powered by an internal combustion engines (ICE) is well known. Vehicles powered by electric motors attempt to address these needs. However, electric vehicles have limited range and limited power capabilities and need substantial time to recharge their batteries. An alternative solution is to combine both an ICE and electric traction motor into one vehicle. Such vehicles are typically called Hybrid Electric Vehicles (HEVs). See generally, U.S. Pat. No. 5,343,970 (Severinsky).

The HEV is described in a variety of configurations. Many HEV patents disclose systems in which an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A Parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE.

A Parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gearset transaxle. A first electric motor, the generator, is connected to a sun gear. The ICE is connected to a carrier. A second electric motor, a traction motor, is connected to a ring (output) gear via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used.

The desirability of combining an ICE with an electric motor is clear. The ICE's fuel consumption and emissions are reduced with no appreciable loss of vehicle performance or range. Nevertheless, there remains a substantial opportunity to develop ways to optimize HEV operation.

One area of development is maintaining the desired operating temperature of the HEV components. A cooling system maintains optimal component operation and performance. Overheated components adversely affect efficiency and may eventually cause component failure.

A typical prior art cooling system for an ICE vehicle has a coolant fluid in an enclosed loop that passes through certain vehicle components and a heat exchanger (radiator). A heater core is also typically added to vent engine heat into the passenger compartment as desired. The engine and transmission components typically require cooling from a liquid cooling system. As the coolant circulates through these components in the closed loop, it absorbs heat that is released as the coolant passes through the radiator and heater core.

Coolant flow in the prior art cooling system is typically controlled by a pump driven front-end accessory drive (FEAD). As engine speed increases, the speed of the pump also increases allowing more coolant flow through the system. Additionally, a thermostat within the loop only allows coolant flow through the radiator after the coolant temperature reaches a level at which the engine temperature has stabilized and is considered "warmed up."

Though simple and reliable, the prior art coolant control system comprising a pump and a thermostat is inadequate for HEVs. For example, the HEV has additional components that require cooling. Further, the prior art coolant pump does not function when the engine is off. Thus, the typical vehicle accessories driven by the FEAD (including the coolant pump, air conditioning, and power steering) in a conventional vehicle must be powered by an alternate source in the HEV to maintain their functionality when the engine is not running.

Electric coolant pump control systems exist in the prior art for electric motor powered vehicles, but those systems do not completely meet the coolant control system needs of an HEV. In Barrie, et. al. (U.S. Pat. No. 5,217,085) (Ford Motor Company) a coolant system control module varies the coolant system pump speed by varying its duty cycle in response to a temperature sensor. The electric pump delivers fluid to a temperature responsive valve that controls flow to the heat exchanger. The Barrie patent does not address the cooling needs of the vehicle's internal combustion engine. Thus, a second prior art coolant system for the engine is also required. Unfortunately, two coolant systems within the same vehicle increase the complexity and cost of the HEV.

SUMMARY OF THE INVENTION

Accordingly, the present invention provides a method and system to control the liquid cooling needs of all HEV powertrain and accessory components in a single loop system. The method and system implement an electric coolant pump control strategy that sets a pump duty cycle (and thus coolant flow rate) according to a calibratable table as a function of engine temperature and electric motor temperature.

DETAILED DESCRIPTION OF THE PREFERRED EMBODIMENT

Controlling vehicle component temperatures below calibratable thresholds insures not only the functionality of vehicle components but also operational efficiency. The present invention combines both engine and motor powertrain components of a hybrid electric vehicle into one coolant control system, thereby avoiding redundancy and gaining efficiency.

Figure 1:
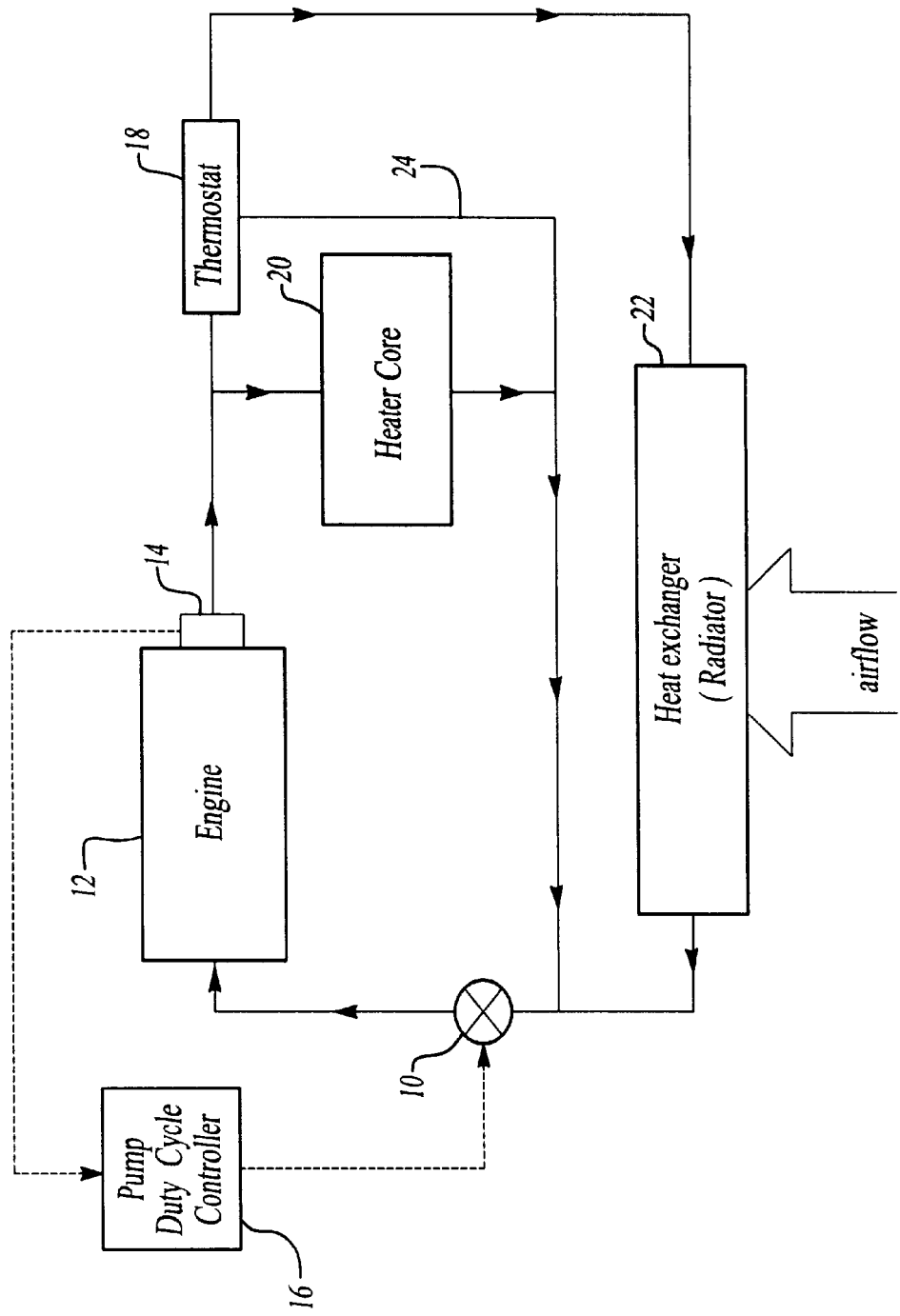
FIG. 1 illustrates a prior art engine coolant system configuration with an electric coolant pump.

A prior art cooling system schematic for a conventional vehicle with an electric coolant pump is shown in FIG. 1. An Electric Coolant Pump 10 pumps coolant to an Engine 12. As coolant passes through the Engine 12, it absorbs heat, by conduction, created by Engine 12 combustion. After the coolant leaves the Engine 12, its temperature is measured by an Engine Temperature Sensor (ETS) 14 that sends a signal to a Pump Duty Cycle Controller 16. The ETS Sensor 14 can be an engine coolant temperature sensor or a cylinder head temperature sensor.

The speed of the Electric Coolant Pump 10 is controlled in accordance with the signal from the ETS Sensor 14. For example, when the Engine 12 temperature is relatively high, the Electric Coolant Pump 10 is on at 100% speed.

The coolant continues, through the loop to a Thermostat 18 and a Heater Core 20. The Heater Core 20 rejects heat from the coolant to the passenger compartment based on driver demand such as a dash panel selection for heat and blower speed. The Thermostat 18 controls the amount of coolant allowed through the heat exchanger path of the system. When the coolant is hot, the Thermostat 18 allows the coolant to proceed to a Heat Exchanger (Radiator) 22 where airflow across the Radiator 22 draws heat out of the coolant. From the Radiator 22, the coolant is drawn back to the Electric Coolant Pump 10. When the coolant is cool, the Thermostat 18 allows the coolant to proceed immediately back to the Electric Coolant Pump 10 through a Thermostat Bypass Path 24 path and Heater Core 20 of the system. Since the Heater Core 20 also receives coolant, it acts as a heat exchanger that vents heat from the coolant into the passenger compartment when requested. After leaving the Heater Core 20, the coolant proceeds back to the Electric Coolant Pump 10.

Figure 2:
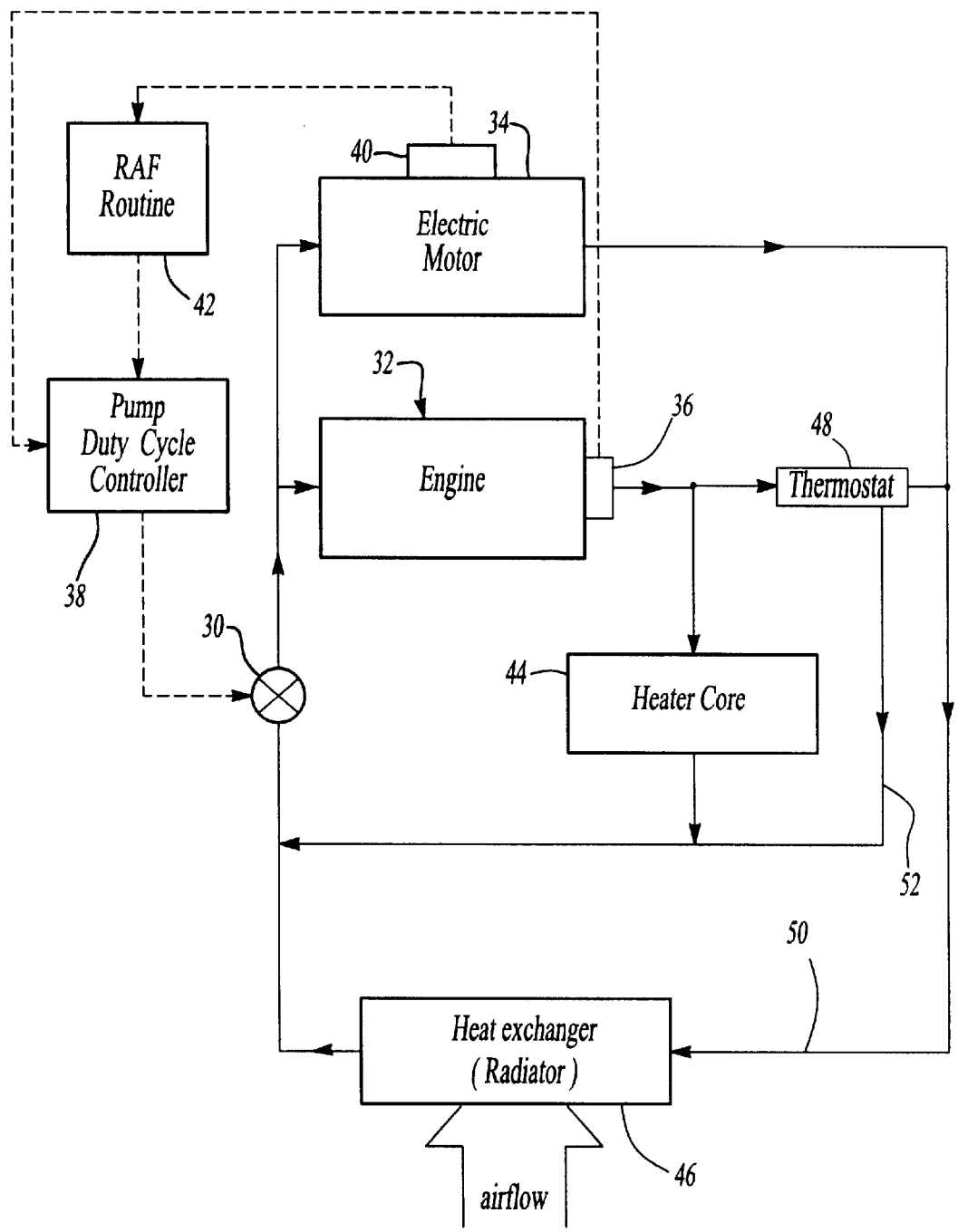
FIG. 2 illustrates an outline of a possible hybrid electric vehicle parallel coolant system with an engine and electric motor including a pump duty cycle controller for the electric coolant pump.
Figure 3:
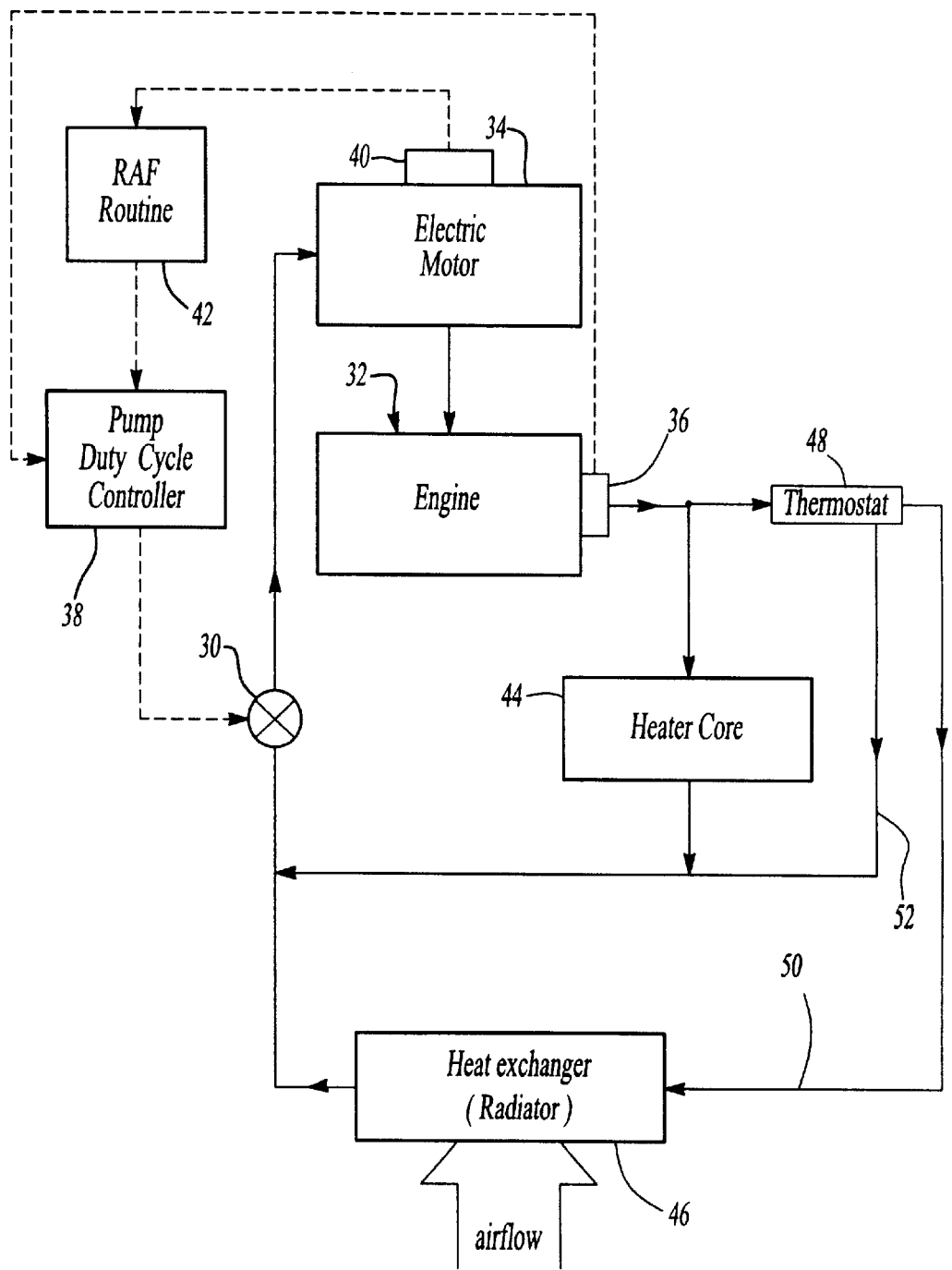
FIG. 3 illustrates an outline of a possible hybrid electric vehicle series coolant system with an engine and electric motor including a pump duty cycle controller for the electric coolant pump.

The present invention, illustrated in FIGS. 2 and 3, is shown in a single closed loop HEV coolant system. Many types of configurations are possible and FIGS. 2 and 3 are not meant to limit the use of the present invention.

In the configuration shown in FIG. 2, an HEV Electric Coolant Pump 30 pumps coolant to an HEV Engine 32 and an HEV Electric Motor 34 in a parallel arrangement. As the coolant passes through the HEV Engine 32, it absorbs heat, by conduction, created by the HEV Engine 32 combustion. The HEV Engine 32 temperature is measured by an HEV Engine temperature sensor (HEV ETS) 36 that sends a signal to an HEV Pump Duty Cycle Controller 38. The HEV ETS 36 can measure HEV Engine 32 coolant temperature or HEV Engine 32 cylinder head temperature.

As the coolant passes through the HEV Electric Motor 34, it absorbs heat, by conduction, generated by the HEV Electric Motor 34. The HEV Electric Motor 34 temperature is measured by an HEV Motor Temperature Sensor (HEV MTS) 40 which sends a signal to the HEV Pump Duty Cycle Controller 38 through an HEV Rolling Average Filter (RAF) 42. The RAF 42 filters out the very rapid excursions in temperature signals from the HEV MTS 40 to average the temperature signal to the HEV Pump Duty Cycle Controller 38. The HEV MTS 40 can measure HEV Electric Motor 34 coolant temperature or HEV Electric Motor 34 winding temperature. Coolant passing through the HEV Electric Motor 34, continues to flow through an HEV Heat Exchanger (Radiator) 46 and returns to the HEV Electric Coolant Pump 30.

The coolant from the HEV Engine 32 continues through the loop to an HEV Heater Core 44 and an HEV Thermostat 48. The Heater Core 20 rejects heat from the coolant to the passenger compartment based on driver demand such as a dash panel selection for heat and blower speed. After leaving the HEV Heater Core 44, the coolant proceeds back to the HEV Electric Coolant Pump 30.

The HEV Thermostat 48 controls coolant flow through a heat exchanger path 50 of the system. When the coolant is hot, the HEV Thermostat 48 allows coolant to proceed to the HEV (Radiator) 46 where airflow across the HEV Radiator 46 draws heat out of the coolant. From the HEV Radiator 46, the coolant is drawn back to the HEV Electric Coolant Pump 30. When the coolant is cool, the HEV Thermostat 48 allows the coolant to proceed immediately back to the HEV Electric Coolant Pump 30 via a Thermostat Bypass Path 52 and Heater Core 44. In addition, coolant is circulated through the Electric Motor 34 and returns to the HEV Electric Coolant Pump 30. This is desirable because the Electric Motor 34 has a higher power capability if it is constantly being cooled.

FIG. 2 is considered a parallel configuration because the Electric Coolant Pump 30 simultaneously delivers coolant to both the HEV Engine 32 and the HEV Electric Motor 34.

FIG. 3 illustrates a series configuration. This configuration is identical to FIG. 2 except that the HEV Electric Coolant Pump 30 does not simultaneously deliver coolant to both the HEV Engine 32 and the HEV Electric Motor 34. Instead, it delivers it solely to the HEV Electric Motor 34 and from the HEV Electric Motor 34, coolant flows to the HEV Engine 32. From the HEV Engine 32, coolant flows through the HEV Heater Core 44 and the HEV Thermostat 48. In this configuration, as shown, unlike the parallel configuration of FIG. 2, coolant from the HEV Electric Motor 34 also passes through the HEV Heater Core 44 and the HEV Thermostat 48. Other types of coolant flow configurations are possible and the configurations shown in FIG. 2 and FIG. 3 are not meant to limit this invention.

Figure 4:
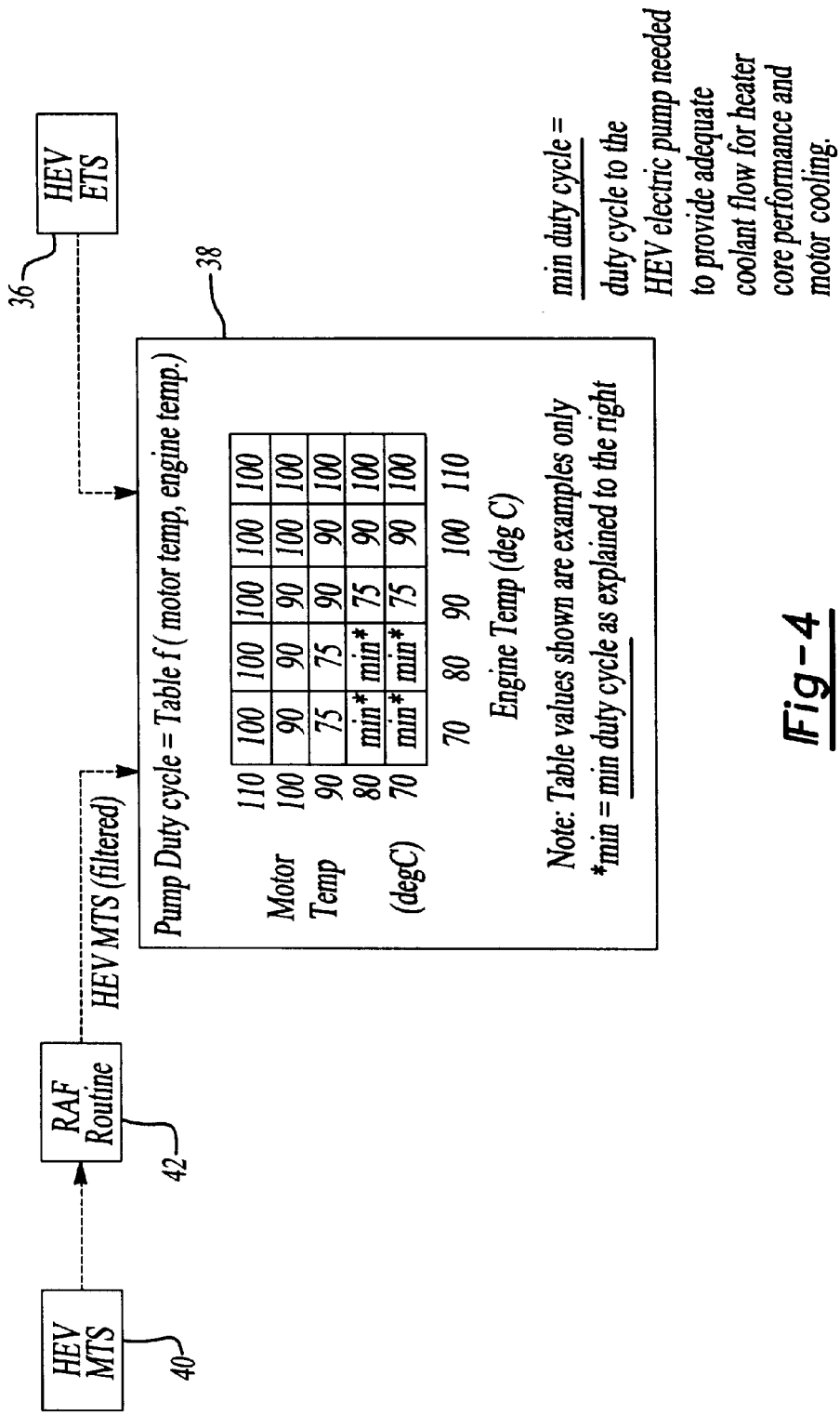
FIG. 4 illustrates the detail of one possible strategy for a pump duty cycle strategy for the electric coolant pump.

The function of the HEV Pump Duty Cycle Controller 38 is the essence of this invention, and the detail of a sample illustration is shown as FIG. 4. An HEV pump duty cycle refers to the amount of time the HEV Electric Coolant Pump 30 is "on" versus "off." For example, 100% duty cycle would mean the pump is fully on and 0% means the pump is fully off. Duty cycle also refers to the actual signal being sent to the HEV Electric Coolant Pump 30. The signal is either "high" (maximum power supply) or "low" (no power). To get pump flow rates in between, for example 50%, the signal to the pump would be "high" 50% of the time and "low" the other 50% of the time.

FIG. 4 illustrates the pump duty cycle strategy table as a function of Engine temperature from the HEV ETS 36 and the HEV Electric Motor 34 temperature from the HEV RAF 42 filtered HEV MTS 40. Actual values in the HEV Pump Duty Cycle Controller 38 are shown as examples only.

When calibrated properly, the HEV Pump Duty Cycle Controller 38 (and thus the coolant flow) increases for increasing HEV Engine 32 and/or HEV Electric Motor 34 temperature. A minimum amount of coolant flow is always delivered to facilitate carrying heat from the coolant to the HEV Heater Core 44 for passenger heat request. Further, the controller must maintain optimum operating vehicle component temperatures.

The preferred strategy illustrated in FIG. 4 provides many improvements over the prior art. It controls the cooling needs of an engine and Electric Traction Motor of an HEV within a single closed loop system. Further, this pump control approach could potentially lead to a redesigned cooling system that does not require the added complexity and cost of a thermostat.

We claim:

1. A system for controlling coolant flow to cool an electric traction motor and an internal combustion engine of a hybrid electric vehicle (HEV), comprising:

an electric coolant pump with an output and a return;

a closed coolant flow path connecting to the electric coolant pump output, flowing through the electric traction motor and the internal combustion engine of the HEV to be cooled, and ending at an electric coolant pump return;

the electric traction motor and the internal combustion engine having temperature sensors that send temperature signals to an electric coolant pump duty cycle controller; and the controller establishing a duty cycle of the electric coolant pump as a function of temperatures of the electric traction motor and internal combustion engine, wherein at least one of the temperature sensors associated with the electric traction motor generates a signal that is filtered to provide a signal that is adjusted to minimize the effect of rapid excursions in temperature signals.

2. The system for controlling coolant flow to cool components of an HEV of claim 1 wherein the motor temperature is acquired by sending coolant temperature leaving the motor.

3. The system for controlling coolant flow to cool components of an HEV of claim 1 wherein a motor temperature is acquired by sensing motor winding temperature.

4. The system for controlling coolant flow to cool components of a hybrid electric vehicle of claim 1, wherein an engine temperature is acquired by sensing engine coolant temperature leaving a cylinder head.

5. The system for controlling coolant flow to cool components of a hybrid electric vehicle of claim 1 wherein the engine temperature is acquired by sensing the engine cylinder head temperature.

6. The system for controlling coolant flow to cool components of a hybrid electric vehicle of claim 1 wherein the coolant flow path is in a parallel configuration.

7. The system for controlling coolant flow to cool components of a hybrid electric vehicle of claim 1 wherein the coolant flow path is in a series configuration.

8. The system for controlling coolant flow to cool components of a hybrid electric vehicle of claim 1 wherein the coolant flow path further flows through a heater core connected between the hybrid electric vehicle components and the electric coolant pump return, whereby passenger heating requests are facilitated.

9. The system for controlling coolant flow to cool components of an HEV of claim 1 further comprising a rolling average filter routine connected between the temperature sensor for the motor and the control strategy, whereby the average temperature of the motor is acquired.

10. A method for controlling coolant flow to cool an electric traction motor and an internal combustion engine of a hybrid electric vehicle (HEV), comprising the steps of:

pumping coolant with an electric coolant pump having an output and a return;

flowing the coolant through a closed flow path to the electric coolant pump output, the electric traction motor, the internal combustion engine of the HEV to be cooled, and then returning at an electric coolant pump return;

sensing the electric traction motor temperature and the internal combustion engine temperature;

signaling the electric traction motor temperature and the internal combustion engine temperature to an electric coolant pump duty cycle controller; and determining a duty cycle of the electric coolant pump as a function of the temperature of the electric traction motor and the internal combustion engine, wherein a rolling average of at least one temperature signal from the electric traction motor is used in determining the duty cycle of the electric coolant pump.

11. The method for controlling coolant flow to cool components of an HEV of claim 10, wherein sensing motor temperature is acquired by sensing coolant temperature leaving the motor.

12. The method for controlling coolant flow to cool components of an HEV of claim 10 wherein sensing motor temperature is acquired by sensing motor winding temperature.

13. The method for controlling coolant flow to cool components of an HEV of claim 10, wherein sensing engine temperature is acquired by sensing engine coolant temperature leaving the cylinder head.

14. The method for controlling coolant flow to cool components of an HEV of claim 10 wherein sensing engine temperature is acquired by sensing engine cylinder head temperature.

15. The method for controlling coolant flow to cool components of an HEV of claim 10 wherein flowing the coolant through a closed flow path is a parallel configuration.

16. The method for controlling coolant flow to cool components of an HEV of claim 10 wherein flowing the coolant through a closed flow path is a series configuration.

17. The method for controlling coolant flow to cool components of an HEV of claim 10 further comprising the step of flowing coolant through a heater core connected between the HEV components and the electric coolant pump return, whereby passenger heating requests are facilitated.

18. The method for controlling coolant flow to cool components of an HEV of claim 10 further comprising the step of determining a rolling average filter between the temperature sensing step for the motor and the control strategy, whereby the average temperature of the motor is acquired.

* * * * *